July 3, 1934.　　　　　G. J. ZIEGLER　　　　　1,964,780
TRACTOR WHEEL
Filed Jan. 3, 1933　　　3 Sheets-Sheet 1
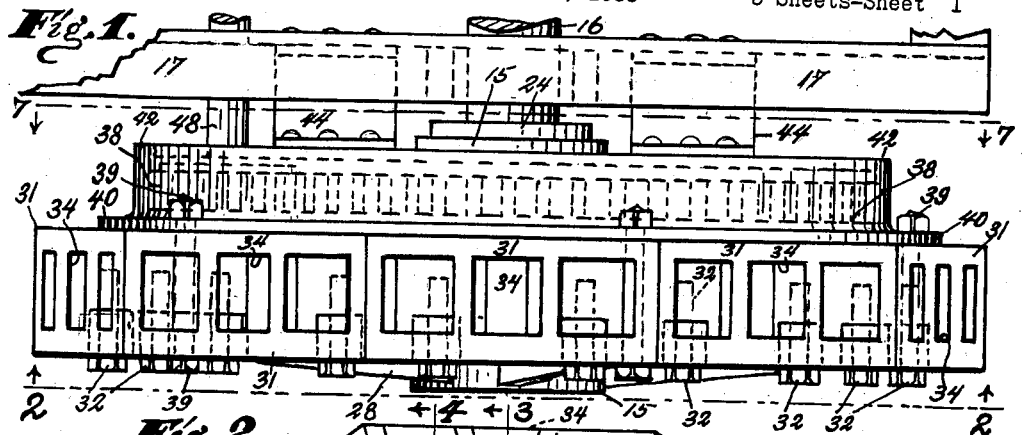
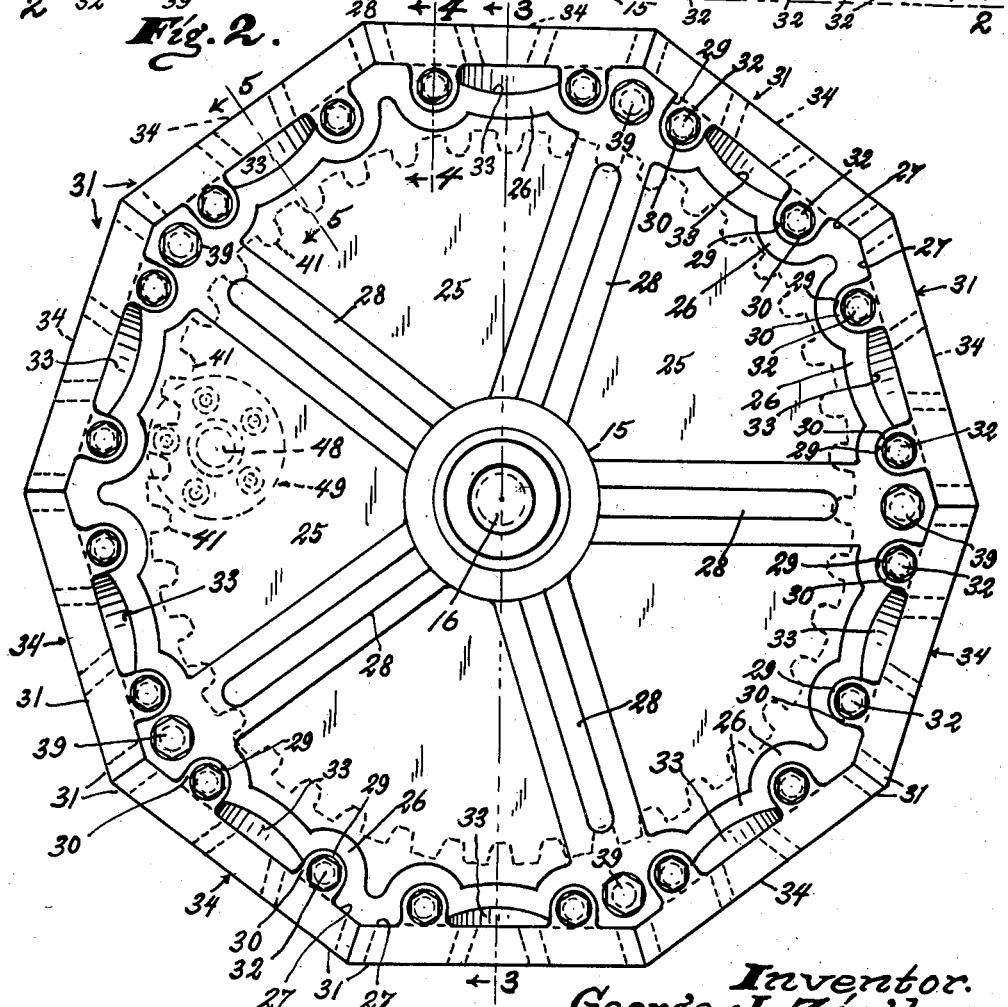
Inventor.
George J. Ziegler.
By William M. Gentle,
His Attorney.

July 3, 1934.  G. J. ZIEGLER  1,964,780
TRACTOR WHEEL
Filed Jan. 3, 1933   3 Sheets-Sheet 2
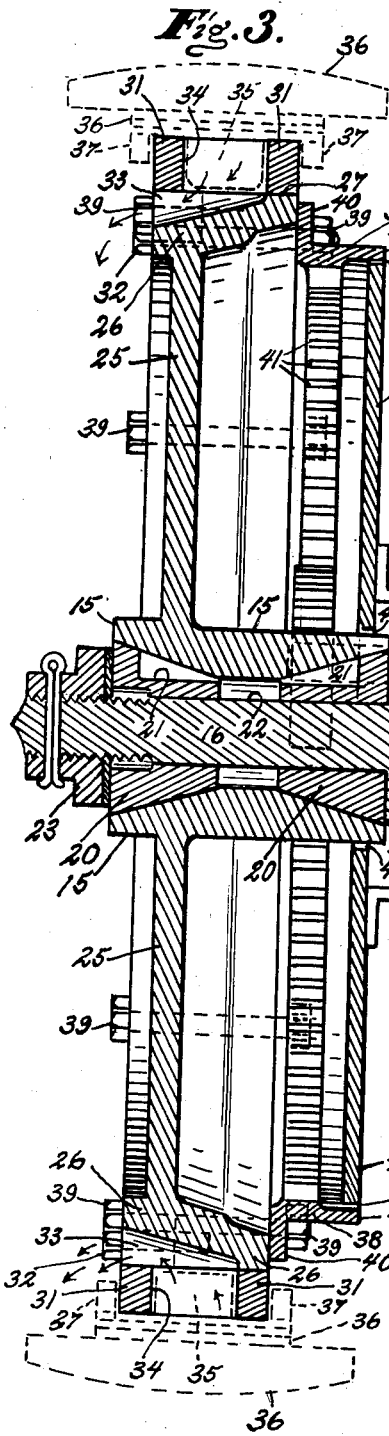
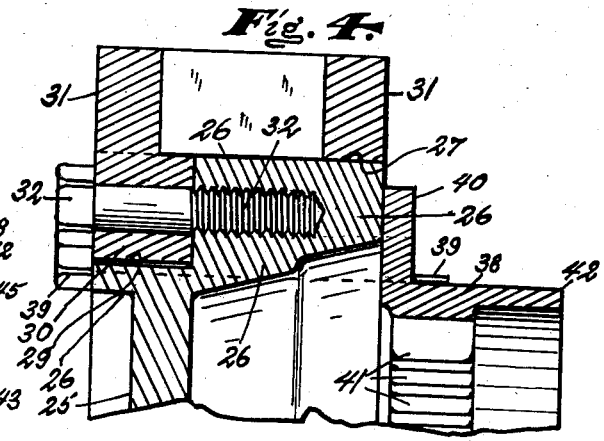
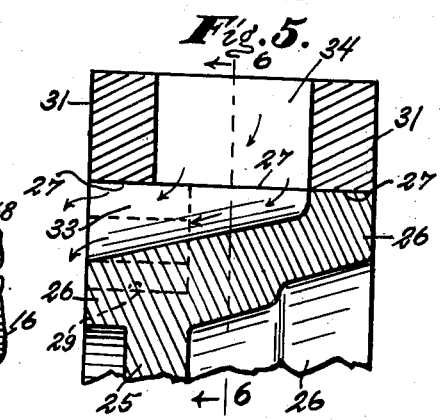
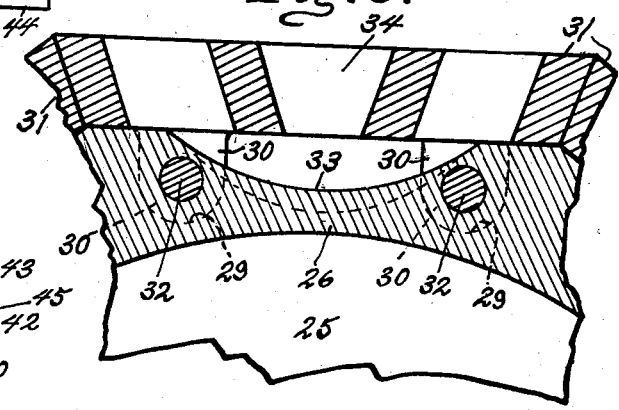
Inventor.
George J. Ziegler.
By William M. Gentle,
His Attorney.

July 3, 1934.  G. J. ZIEGLER  1,964,780
TRACTOR WHEEL
Filed Jan. 3, 1933   3 Sheets-Sheet 3
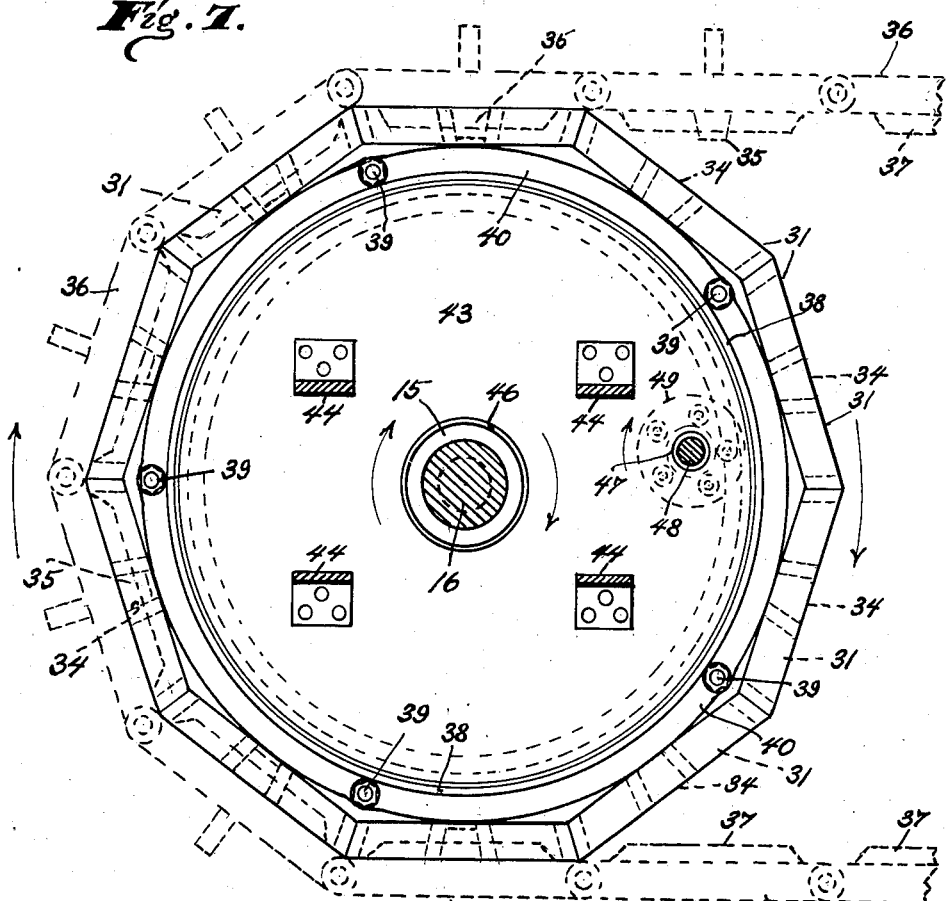
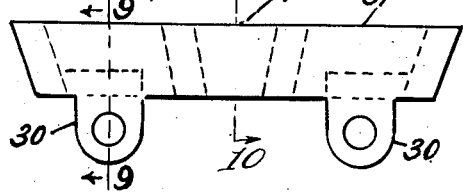
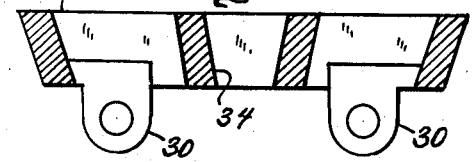
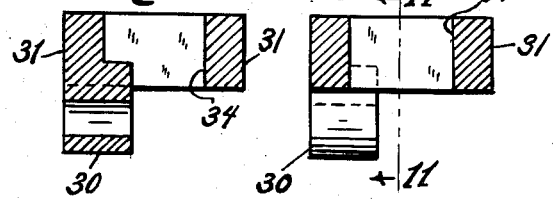
Inventor.
George J. Ziegler.
By William M. Gentle
His Attorney.

Patented July 3, 1934

1,964,780

UNITED STATES PATENT OFFICE 1,964,780

TRACTOR WHEEL

George J. Ziegler, Los Angeles, Calif., assignor of one-half to Charles J. Heyler, Los Angeles, Calif.

Application January 3, 1933, Serial No. 649,831

5 Claims. (Cl. 74—31)

This invention relates to a wheel for a tractor, and the principal object is to provide a relatively strong driving connection between the wheel and the endless track chain with means for preventing dirt inadvertently picked up by the chain from clogging the driving means. To that end I provide a wheel with ten flat peripheral faces that carry detachable shoes having center cog sockets arranged over a recess passage in the rim of the wheel through which dirt can be discharged when the cogs of the endless track chains enter the sockets. In other words, if inadvertently the sockets in the shoes are filled with dirt, mud or the like, the cogs of the chains on entering the sockets will automatically force the material out through the recess passages, and thereby keep the sockets relatively clean, or so they will not clog and interfere with the smooth uniform driving connection between the drive wheel and chain. This construction and arrangement of parts permits the chain to be in relatively full contact with the shoes at all time so that in turning the tractor the chain cannot be displaced transversely from the wheel. That is, by permitting the cogs of the chain to enter to a full depth into the shoe sockets also permits the side guards of the chain to fully engage the sides of the shoes so the chain cannot be displaced transversely.

Another object of the invention is to provide a tractor wheel having an internal gear drive that is enclosed in a housing that effectively prevents dirt and the like from interfering with the gears. To that end I provide the housing with an annular extension having an open end in which I support a non-rotary disk and guard around which the extension rotates with the wheel that prevents dirt from entering the gear chamber.

A feature of invention is shown in the construction and arrangement of the drive wheel shoes whereby they are detachably connected so they can be placed on or removed from the outside of the wheel; and also they are arranged thereon so they impart a large part of the driving strain to the chain links to thereby relieve excessive strain on the chain cogs.

Other objects, advantages and features of invention may appear from the accompanying drawings, the subjoined detailed description and the appended claims.

The accompanying drawings illustrate the invention.

In the following description of the figures the side of the wheel next to the frame is called the "inside" and the other the "outside".

Figure 1 is a fragmental plan view of a tractor frame having a wheel connected thereto that is constructed in accordance with this invention, parts omitted and other parts indicated semidiagrammatically.

Figure 2 is an outside view of the wheel as seen from the line 2—2, Fig. 1, with the internal gear drive indicated semidiagrammatically.

Fig. 3 is an enlarged fragmental section on the line 3—3, Fig. 2, and by dotted lines showing a link of the track chain both above and below the wheel to illustrate their connection.

Fig. 4 is an enlarged fragmental section on line 4—4, Fig. 2, showing how the shoes are detachably connected so they can be placed on or removed from the outside of the wheel.

Fig. 5 is an enlarged fragmental section on the line 5—5, Fig. 2, showing in detail one of the recess passages of the wheel as related to one of the sockets of the detachable shoes, parts omitted for the sake of clearness in the drawings.

Fig. 6 is an enlarged fragmental section on the line 6—6, Fig. 5, further illustrating the connection of the recess passages of the wheel to the shoe sockets.

Fig. 7 is a section on line 7—7, Fig. 1, on a slightly smaller scale showing the side of the wheel opposite to that shown in Fig. 2, and showing the means for supporting the disk mud guard in the annular extension to the gear housing; and also indicating by dotted lines a portion of the endless track chain as related to the tractor wheel.

Fig. 8 is a side view of one of the tread shoes detached from the wheel.

Fig. 9 is a cross section on the line 9—9, Fig. 8.

Fig. 10 is a cross section on line 10—10, Fig. 8.

Fig. 11 is a longitudinal section on line 11—11, Fig. 10.

In detail the tractor wheel includes an elongated hub 15 that is rotatably secured on an axle 16, as best shown in Fig. 3; and as seen therein 16, as best shown in Fig. 3; and as seen therein the axle 16 is secured to the frame 17 by bolts 18 and bearing strap 19.

Interposed between the axle 16 and hub 15 are the cone bearing blocks 20, that are recessed at 21 to form receptacles for lubricant, and also their inner ends are spaced apart to form an annular grease chamber 22 around the axle.

The hub and associated parts are secured on the axle by the lock nut 23 which holds the inner cone bearing block 20 against the annular flange 24 that is integral with the axle.

Integral with the hub 15 adjacent the outer end thereof is a disk-like web 25 that at its outer edge is integral with a widened rim 26 having ten flat peripheral faces 27 that are equal with each other as to their lengths and widths. If desired the web 25 can be strengthened by the integral radial ribs 28 as indicated in Figs. 1 and 2.

The rim 26 is recessed at its outer edge to form pairs of spaced sockets 29 for the pairs of lugs 30 of the skeleton shoes 31, and these recesses are in pairs arranged so the lugs 30 will enter them either when the shoes are moved in lines perpendicular to the longitudinal axis of the axle or transversely over the peripheral faces 27 of the wheel.

The lugs 30 are secured in the sockets 29 by stud bolts 32, as best shown in Figs. 2 and 4. The lugs, recesses and bolts are arranged so the shoes 31 can be easily placed on or removed from the outside thereof as related to the assembled tractor. That is, the term "inside" of the wheel is used to designate the side of the wheel adjacent the frame and the other the "outside", as previously indicated.

The rim 26 has transverse recess passages 33 therein that are arranged centrally in the faces 27 and are inclined from the inner edge of the rim outwardly and inwardly toward the axis of the hub; and these passages are arranged under the shoes 31 and centrally under the cog sockets 34 in the skeleton shoes.

The passages 33 are arranged under the open ends of the cog-sockets 34 so dirt can be forced out of the sockets and through the passages when the cogs 35 of an endless chain 36 enter the sockets. In other words, the purpose of the passages is to prevent dirt from being packed in the cog-sockets in the event that it is carried to the drive wheel by the endless track chains, as it will be when the tractor is used in loose soil such as a plowed field.

The shoes 31 are full skeleton form, as best shown in Figs. 8 to 11 inclusive, for the purpose of reducing the weight of the wheel, and they are formed with their outside walls smooth and aligned so that the side-guards 37 on the chain 36 will be parallel with the sides when assembled and engage them to hold the chain on the wheel when the tractor is being turned so that all the side thrust of turning is not applied to the chain cogs. In other words, the purpose of the guards 37 is to aid the cogs 35 in holding the chain centrally on the wheel when the tractor is making short turns.

It is understood that the chain 36 forms no part of this invention further than that the wheel is constructed to operate with a chain such as is shown in my prior application for United States Letters Patent on a tractor, Serial Number 637,051, filed October 10, 1932.

This chain is shown by dotted lines in Figs. 3 and 7 for the purpose of illustrating how the cogs 35 on entering the cog sockets 34 will drive the dirt out of the sockets and through the passages 33, as indicated by the arrows in Figs. 3 and 5. By the foregoing means the cog sockets 34 in the shoes 31 are kept relatively clear of dirt which otherwise would pack in them if they did not have open bottoms and by-passes from them.

A gear housing 38 is secured to the inside wall of the rim 26 by bolts 39 that extend entirely through the rim 26 and flange 40 that is integral with the housing.

An internal gear 41 is integral with the housing 38, and also integral with this housing is an annular flange 42 that has its open end closed by a disk mud-guard 43 that is held from rotation and centrally therein by brackets 44 that are secured to the mud-guard 43 and frame 17, as best shown in Figs. 1 and 3. In Fig. 3 the space 45 that is shown between the rim of the mud-guard 43 and the inside wall of the annular flange 42 is exaggerated as to size for the purpose of illustration. In actual practice there is a very close fit between the rim of the guard and inner wall of the flange to exclude the dust and dirt from the gear housing. Also there is an opening 46 through the disk for the hub 15 and also another opening 47 for the drive shaft 48.

A pinion 49 in mesh with the gear 41 is secured to shaft 48 so that when the shaft 48 is driven the tractor wheel will be driven by the pinion 49 and gear 41.

By the foregoing construction and arrangement of parts the gear drive of the tractor wheel is effectively guarded against dust and dirt.

In use the wheel is driven as fully described, and also its cog sockets are kept clean and its gear drive protected from dirt and dust as fully described.

I claim as my invention:

1. A tractor wheel including a rim having flat peripheral faces and also having passages therein that are arranged transversely and inclined relative to the faces of said rim, shoes mounted on said rim, and means detachably securing said shoes to said rim, and said shoes having open bottom sockets therein that are in register with said passages so that material inclined to clog said sockets can be forced out of them through said passages.

2. A tractor wheel including a rim having flat peripheral faces and also having passages therein that are arranged transversely and inclined relative to the faces of said rim, skeleton shoes mounted on the rim, and means detachably securing said shoe to said rim, said shoes having open bottom sockets therein that are in register with said passages so that material inclined to clog said sockets can be forced out of them through said passages.

3. A tractor wheel including a rim having a plurality of flat peripheral faces thereon and with passages arranged centrally and transversely therethrough and inclined thereto, shoes for said faces that have open bottom sockets therein that are adapted to be in register with said passages, and screw bolts for detachably securing said shoes to said rim to hold said sockets in register with said passages said shoes secured so they are removable and replaceable from the outside of said tractor wheel.

4. A tractor wheel including a rim having a plurality of flat peripheral faces thereon, recess passages arranged centrally and transversely in said faces and inclined thereto, pairs of lug sockets in said rim adjacent the outside edge thereof, skeleton shoes for said faces that have open-bottom cog-sockets therein that are in register with said passages, pairs of lugs on said shoes for said pairs of lug sockets, and stud bolts for detachably securing said lugs to said rim.

5. A tractor wheel including a hub, a rim, a disk integral with and interposed between said hub and rim, a plurality of flat peripheral faces to said rim, passages arranged centrally and transversely in said faces and inclined from the inner edge of said rim outwardly and inwardly toward the axis of said hub, pairs of lug sockets in said rim adjacent the outer edge thereof, skeleton shoes for said faces, open bottom cog sockets in said shoes that are in register with said passages, pairs of lugs for each of said shoes that are adapted to be fitted into their respective pairs of lug sockets, and stud bolts for securing said lugs to said rim.

GEORGE J. ZIEGLER.